United States Patent [19]

Rosén

[11] Patent Number: 5,423,160
[45] Date of Patent: Jun. 13, 1995

[54] METHOD OF PRODUCING INTERIORLY STERILE, CUP OR BEAKER SHAPED CONTAINERS

[75] Inventor: Ake Rosén, Helsingboro, Sweden

[73] Assignee: Tetra Laval Holdings & Finance SA, Pully, Switzerland

[21] Appl. No.: 132,203

[22] Filed: Oct. 6, 1993

[30] Foreign Application Priority Data

Oct. 7, 1992 [SE] Sweden ................... 9202930

[51] Int. Cl.⁶ ............ B65B 47/02; B65B 55/06
[52] U.S. Cl. .................... 53/426; 53/453; 53/561
[58] Field of Search ........ 53/453, 559, 561, 425, 53/426; 422/1

[56] References Cited

U.S. PATENT DOCUMENTS

| | | | |
|---|---|---|---|
| 3,634,997 | 1/1972 | Tait | 53/426 X |
| 4,102,974 | 7/1978 | Boni | 264/294 |
| 4,155,786 | 5/1979 | Corbic | 53/556 X |
| 4,224,779 | 9/1980 | Guedet | 53/426 |
| 4,329,829 | 5/1982 | Torterotot | 53/426 |
| 4,543,770 | 10/1985 | Walter et al. | 53/426 X |
| 4,866,117 | 9/1989 | Egashira et al. | 524/406 |
| 5,069,017 | 12/1991 | Fabricius | 53/426 |

FOREIGN PATENT DOCUMENTS 0012890 7/1980 European Pat. Off.
59-157131 9/1984 Japan.

Primary Examiner—James F. Coan
Attorney, Agent, or Firm—Burns, Doane, Swecker & Mathis

[57] ABSTRACT

The disclosure relates to a method of producing interiorly sterile, cup or beaker shaped containers. A starting material for the containers is produced by mixing inorganic filler with a thermoformable polymer material in such a mixing ratio that the quantity of filler in the produced starting material is at least 40% of the total weight of the mixture. The starting material is extruded into a continuous web which is heated to a temperature suitable for thermoforming of the web, at least 190° C., and is fed into a forming machine of conventional type for thermoforming of the web under vacuum at the above-mentioned temperature for forming web-like continuous, interiorly sterile, cup or beaker shaped containers. The containers are finally separated from one another by incisions in the web regions between the opening contours of each respective container.

10 Claims, No Drawings

METHOD OF PRODUCING INTERIORLY STERILE, CUP OR BEAKER SHAPED CONTAINERS

TECHNICAL FIELD

The present invention relates to a method of producing interiorly sterile, cup or beaker shaped containers.

BACKGROUND ART

It is previously known in the art to produce interiorly sterile, cup or beaker shaped containers of plastics by thermoforming a sheet or web of polyethylene or polypropylene. In such instance, the sheet or web is heated to a temperature suitable for thermoforming the web— which lies, for the above-mentioned plastics materials, in the range of between 110° and 160° C., and is then fed into a conventional forming machine with the aid of which the thermoforming process takes place under applied vacuum. The web-like continuous, thermoformed containers are filled with their intended contents such as, for example, sterilized food, and are overlaid by a web-shaped sterilized plastic foil which is permanently sealed against the subjacent thermoformed web in the regions around the opening contours of the containers. Finally, the thus filled, sealed containers are separated from one another by incisions in the sealing regions or zones around the container openings.

As has already been mentioned, the thermoforming operation takes place at a temperature within the range of between 110° and 160° C. which, for the above-disclosed plastics, corresponds to those temperatures at which the web is sufficiently "pliable" to be able to be processed or formed under the applied vacuum, and, at the same time, sufficiently "stiff" to result in vacuum-formed containers of the desired uniform material thickness.

The heating and processing times which are normally employed in thermoforming in the above-described manner are between 3 and 20 seconds. In order for a satisfactory sterilization of the web to be obtained at the above processing temperatures of between 110° and 160° C., a very long stay time is, therefore, required for the web at these temperatures, for example 300 min. at 121° C. or 12 min. at 160° C. In order to avoid such unacceptably long stay times, the sterilization of the web must, therefore, take place by a separate preceding sterilization step, using such means as, for example, a hydrogen peroxide bath through which the web is led prior to the heating and the subsequent thermoforming in the forming machine.

OBJECTS OF THE INVENTION

One object of the present invention is, therefore, to obviate the above-outlined drawbacks inherent in the prior art method.

A further object of the present invention is to propose a method for producing interiorly sterile, cup or beaker shaped containers which may be produced by thermoforming within those heating and processing times which are conventionally employed in thermoforming without the need for a preceding, separate sterilization stage for achieving satisfactory sterilization.

SOLUTION

These and other objects are attained according to the present invention in that a method of the type described by way of introduction has been given the characterizing features as set forth in appended claim 1.

Further practical and expedient embodiments of the method according to the present invention have moreover been given the characterizing features as set forth in the appended subclaims.

By preparing a starting material for container production employing the method according to the present invention, by mixing inorganic filler and a polymer material in such a mixing ratio that the proportion of the inorganic filler constitutes at least 40%, calculated on the total weight of the mixture, a starting material will be obtained from which a sheet or web may be extruded which is at a processing temperature suitable for thermoforming the web well above—190° C. and even higher—corresponding processing temperatures for those polymer materials which are employed in the conventional method. At these elevated processing temperatures, a completely satisfactory sterilization of the web will be achieved within the space of only 1 to 2 seconds, which lies well within that time frame which is used for heating and processing the web in conventional thermoforming and which, thus, makes it possible to produce interiorly sterile containers without the need for prior, separate sterilization of the web.

Preferred examples of polymer materials which may be employed in carrying out the method according to the present invention comprise propene homopolymers of a melt index of less than 1 according to ASTM (2,16 kg; 230° C.) and ethylene/propylene copolymers of a melt index of between 1 and 5 according to ASTM (2,16 kg; 230° C.) which are capable of accepting filler quantities of up to 80% calculated on the total weight of the starting material.

Among suitable inorganic fillers which may be employed for preparing the starting material for the container production using the method according to the present invention, mention might be made of chalk, kaolin, talc, china clay and mica, but other fillers known in this field may also be employed either separately or in optional mutual combinations with one another or with the previously mentioned fillers. The quantity of filler may, as has already been mentioned, vary between 40 and up to 80% by weight and generally lies within the range of between 50 and 80% by weight, for example 65% by weight.

DESCRIPTION OF PREFERRED EMBODIMENT

The present invention will be illustrated in greater detail hereinbelow with the aid of a non-restrictive practical embodiment cited merely by way of example.

A starting material for producing interiorly sterile, cup or beaker shaped containers employing the method according to the present invention is prepared by mixing granulate or particulate polymer material and fine-grained inorganic filler in such mixing proportions that the thus obtained mixture contains between 40 and 80, preferably 65% filler, calculated on the total weight of the mixture. In this selected embodiment, it is presupposed that the polymer material consists of an ethylene/propylene copolymer of a melt index of between 1 and 5 according to ASTM (2,16 kg; 230° C.) and that the inorganic filler consists of one or more of the previously mentioned filler agents, e.g. chalk.

The two starting components are preferably mixed together in an extruder machine and are then extruded for forming a flexible, planar sheet or web.

The extruded web may either be rolled up and stored for later use, but is preferably fed direct to a heating station where the web is heated, by means of single or double sided heat, contact- or IR heating, to a processing temperature suitable for thermoforming the web, at least 190° C.

The thus heated, hot web is thereafter fed into a forming machine with the aid of which the web is thermoformed under vacuum for forming web-like continuous cup or beaker shaped containers. The forming machine (which may be of conventional type) comprises two mutually movable working surfaces of which one displays evacuable mould cavities which are open towards the web and whose geometric configuration corresponds to the outer geometric shape of the container which is to be produced. The web is, in this instance, inserted in the space between the two movable working surfaces which are thereafter brought together into union with one another in such a manner that the interjacent web is enclosed between the working surfaces. The mould cavities are evacuated, whereby the covering web is, because of the prevailing vacuum, sucked or drawn into the evacuated cavities into abutment against the walls of each respective mould cavity for forming the web-like continuous, cup or beaker shaped containers which, at the same time, are interiorly sterilized as a result of the heat (190° C. or higher) during the thermoforming operation.

After the thermoforming, the vacuum is cancelled in the space between the inner walls of the mould cavities and the outer walls of the thermoformed containers, and the working surfaces are displaced away from one another for exposure of the web which is fed further into a sterile filling chamber allocated to the forming machine and fitted with product filler pipes for filling the interiorly sterile containers with sterile contents, for example liquid food, under aseptic conditions.

After the filling, the web with the thus filled containers is advanced further into a similarly sterile sealing chamber where the filled containers are overlaid by a synchronously advanced, sterile web-like covering film of thermofusible material, e.g. plastics of the same type as the plastics in the subjacent web and, by means of heat and pressure, is permanently and bacteria-tightly sealed against the web in the regions around the opening contours of the thermoformed containers. The thus covered containers are finally separated from one another by incisions in the above-mentioned sealing zones or regions for forming finished, aseptically filled and sealed, cup or beaker shaped containers.

Thus, it is possible, using the method according to the present invention, continually to produce interiorly sterile, aseptically filled and sealed containers employing simple means and conventional equipment, without the need for separate sterilization treatment of the web from which the containers are produced. The method according to the present invention may, moreover, be reduced into practice within the limits of those times which are normally employed for heating and processing the web, which is a considerable improvement as compared with prior art technology.

The present invention should not be considered as restricted to that described above, many modifications being conceivable without departing from the spirit and scope of the appended claims.

What is claimed is:

1. A method of producing interiorly sterile, cup or beaker shaped containers, comprising the steps of:
    a) producing a starting material by mixing inorganic filler with a thermoformable polymer material such that the quantity of filler in the starting material is at least 40% by weight of the total weight of the mixture;
    b) extruding the starting material into a continuous web;
    c) heating the web to a working temperature suitable for thermoforming the web and of at least 190° C.; and
    d) feeding the web into a thermoforming machine under vacuum at said working temperature and forming web-like continuous interiorly sterile, cup or beaker shaped containers.

2. The method as claimed in claim 1, wherein the quantity of filler which is mixed in the starting material is between 40 and 80% of the total weight of the starting material.

3. The method as claimed in claim 1, wherein the quantity of filler which is mixed in the starting material is between 50 and 80% of the total weight of the starting material.

4. The method as claimed in claim 1, wherein the quantity of filler which is mixed in the starting material is 65% of the total weight of the starting material.

5. The method as claimed in claim 1, wherein the starting material contains one or more inorganic filler selected from the group consisting of chalk, kaolin, talc, china clay and mica.

6. The method as claimed in claim 1, wherein the polymer material is a propylene homopolymer having a melt index of less than 1 according to ASTM (2.16 kg; 230° C.).

7. The method as claimed in claim 1, wherein the polymer material is an ethylene/propylene copolymer having a melt index of between 0.5 and 5 according to ASTM (2.16 kg; 230° C.).

8. The method as claimed in claim 1, wherein the polymer material and inorganic filler are mixed in an extruder apparatus.

9. The method as claimed in claim 1, wherein the heating of the web takes place by means of single-sided heating, double-sided heating, contact-heating, or IR heating.

10. The method as claimed in claim 1, wherein the web-like continuous, thermoformed containers are filled with sterile contents under aseptic conditions and are thereafter overlaid with a web-like covering foil which is applied over the containers and which consists of thermofusible plastics which, by means of heat and pressure, is permanently and bacteria-tightly sealed against the web in the regions around the opening contours of the containers.

* * * * *